(12) United States Patent
de Ruijter

(10) Patent No.: US 8,699,630 B2
(45) Date of Patent: Apr. 15, 2014

(54) SYSTEMS AND METHODS FOR HANDLING DATA RATE CHANGES WITHIN A PACKET OR FRAME

(75) Inventor: Hendricus de Ruijter, Sunnyvale, CA (US)

(73) Assignee: Silicon Laboratories Inc., Austin, TX (US)

( * ) Notice: Subject to any disclaimer, the term of this patent is extended or adjusted under 35 U.S.C. 154(b) by 543 days.

(21) Appl. No.: 12/913,080

(22) Filed: Oct. 27, 2010

(65) Prior Publication Data

US 2012/0106679 A1 May 3, 2012

(51) Int. Cl.
*H04L 27/06* (2006.01)

(52) U.S. Cl.
USPC .......................................... 375/340

(58) Field of Classification Search
None
See application file for complete search history.

(56) References Cited

U.S. PATENT DOCUMENTS

| | | | | |
|---|---|---|---|---|
| 6,091,784 A * | 7/2000 | Park et al. | ...................... | 375/298 |
| 6,101,217 A * | 8/2000 | Gut | ................................ | 375/222 |
| 6,359,934 B1 * | 3/2002 | Yoshida | ......................... | 375/262 |
| 2002/0186796 A1 * | 12/2002 | McFarland et al. | ........... | 375/341 |
| 2008/0239940 A1 * | 10/2008 | Ye et al. | ........................ | 370/207 |

OTHER PUBLICATIONS

U.S. Appl. No. 12/943,263, entitled "Systems and Methods for Advanced Monitoring and Control Using an LED Driver in an Optical Processor", filed Nov. 10, 2010.
U.S. Appl. No. 12/975,819, entitled "Systems and Methods for a Digital-to-Charge Converter (DQC)", filed Dec. 22, 2010.

\* cited by examiner

*Primary Examiner* — Chieh M Fan
*Assistant Examiner* — Wednel Cadeau
(74) *Attorney, Agent, or Firm* — Meyertons, Hood, Kivlin, Kowert & Goetzel, P.C.

(57) ABSTRACT

Systems and methods for handling data rate changes within a packet or frame are described. In an embodiment, a system may include a radio frequency (RF) circuit operable to receive a message having a plurality of segments, including a first segment that is modulated according to a first modulation data rate. The system may also include a demodulator circuit coupled to the RF circuit and operable to demodulate the first segment into a first demodulated segment having a demodulation data rate, wherein the demodulation data rate is greater than the first modulation data rate. The system may further include a de-mapper circuit coupled to the demodulator circuit and operable to convert the first demodulated segment into a first converted segment having the first modulation data rate.

19 Claims, 4 Drawing Sheets

500

| DEMOD \ DEMAP | 2-LEVEL | 4-LEVEL | 8-LEVEL |
|---|---|---|---|
| 000 | 1 | 00 | 000 |
| 001 | 1 | 00 | 001 |
| 011 | 1 | 01 | 011 |
| 010 | 1 | 01 | 010 |
| 110 | 0 | 11 | 110 |
| 111 | 0 | 11 | 111 |
| 101 | 0 | 10 | 101 |
| 100 | 0 | 10 | 100 |

SYSTEMS AND METHODS FOR HANDLING DATA RATE CHANGES WITHIN A PACKET OR FRAME

BACKGROUND

1. Field of the Invention

This disclosure relates to telecommunications, and, more particularly, to systems and methods for handling data rate changes within a packet or frame.

2. Description of the Related Art

A wireless network is a type of telecommunications network whose interconnections are implemented using radio-frequency (RF) signals. In these systems, transfer of information is typically accomplished through a modulation process. At a transmitter, a modulator combines a data signal with a carrier wave and the resulting modulated signal is transmitted. Then, at a receiver, an RF stage detects the modulated signal and a demodulator extracts the data signal from the carrier wave.

The modulation process works by modifying the amplitude, frequency, and/or phase of the carrier wave as a function of the data signal. Certain modulation schemes (M-ary modulation) may use orthogonal waveforms to communicate two or more bits at once (i.e., as a single "symbol"), which effectively results in higher data rates. For example, a 4-FSK modulation scheme (i.e., a 4-level scheme) is capable of communicating two bits at once (i.e., a two-bit symbol). Meanwhile, an 8-FSK scheme (i.e., an 8-level scheme) is capable of communicating three bits at once (i.e., a three-bit symbol). Therefore, under similar conditions, a signal transmitted with an 8-FSK scheme has a higher data rate than a signal transmitted with a 4-FSK scheme. However, changing the modulation scheme during the course of a transmission typically requires an expensive resynchronization process.

SUMMARY

Systems and methods for handling data rate changes within a packet or frame are described. In an embodiment, a system may include a radio frequency (RF) circuit operable to receive a message having a plurality of segments, including a first segment that is modulated according to a first modulation data rate. The system may also include a demodulator circuit coupled to the RF circuit and operable to demodulate the first segment into a first demodulated segment having a demodulation data rate, wherein the demodulation data rate is greater than the first modulation data rate. The system may further include a de-mapper circuit coupled to the demodulator circuit and operable to convert the first demodulated segment into a first converted segment having the first modulation data rate.

According to an embodiment, an apparatus may include a demodulator operable to receive a message modulated at least in part with a first modulation data rate and to output a demodulated message having a demodulation data rate, wherein the first modulation data rate is different from the demodulation data rate. The apparatus may also include a de-mapper operable to receive the demodulated message and convert a first portion of the demodulated message into a first converted portion having the first modulation data rate.

According to an embodiment, a method may include the actions of receiving a first message having a first portion modulated with N levels, demodulating the first portion into a first demodulated portion having M levels, where M and N are integers and M is an even multiple of N, and converting the first demodulated portion into a first converted portion having N levels.

Figure 1A:
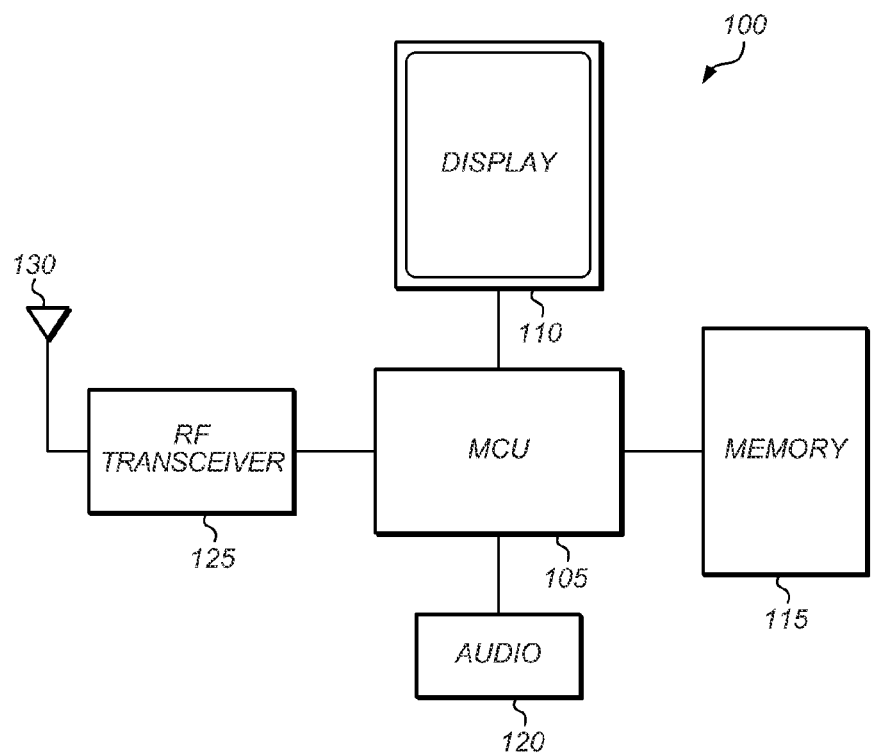
FIG. 1A is a simplified block diagram illustrating an example embodiment of a communications device.

While being susceptible to various modifications and alternative forms, specific embodiments discussed in this specification are shown by way of example in the drawings and will herein be described in detail. It should be understood, however, that the drawings and detailed description are not intended to limit the disclosure to the particular form disclosed, but on the contrary, the intention is to cover all modifications, equivalents and alternatives falling within the spirit and scope of the present disclosure as defined by the appended claims.

DETAILED DESCRIPTION

In the paragraphs that follow, various systems and methods for handling data rate changes within a message (e.g., a packet, frame, or the like) are described. One aspect of the specification relates to a communications device configured to handle data rate changes within a message. This particular communications device is described as a mobile phone for illustration purposes; however, it should be understood the principles described below are equally applicable to any other device with wireless communications capabilities, including, for example, computers, tablets, modems, routers, repeaters, bridges, media players, portable devices, televisions, etc. Another aspect of specification relates to an RF receiver configured to implement methods for handling data rate changes within a message. Although the RF receiver is indicated as a component of a mobile phone, it may be used in any other suitable wireless device. Another aspect of the specification relates to various modes of operation of a demodulator and a de-mapper that enable certain methods for handling data rate changes within a message.

FIG. 1A is a simplified block diagram of communications device 100 according to certain embodiments. As illustrated here, communications device 100 may be a mobile phone or the like. Microcontroller (MCU) 105 interfaces with display 110, memory 115, audio processor 120, and radio-frequency (RF) transceiver 125. RF antenna 130 is coupled to RF transceiver 125. In some embodiments, an inter-integrated ("I²C") bus may be employed to connect two or more of these components, although any other suitable bus may be used. When inter-component interfaces are implemented as a I²C bus, for example, the bus may use two bidirectional open-drain lines, Serial Data Line (SDA) and Serial Clock (SCL). A separate line may be used for synchronization purposes, for example, to prevent interference and/or share resources within device 100.

Typically, MCU 105 may receive system power ("$V_{BAT}$") through a voltage regulator or the like (not shown). And in some embodiments, MCU 105 may be configured to manage power provided to other system components. When powered off, components 110, 115, 120, and/or 125 may not load the shared bus, thus allowing MCU 105 and/or other components to use the bus.

In some cases, MCU 105 may be a low-power programmable controller, microcontroller, processor, microprocessor, field-programmable gate array ("FPGA"), or any other suitable control circuit. For example, MCU 105 may include one or more of integrated random-access memory ("RAM"), read-only memory ("ROM"), flash memory (or other non-volatile memory generally), one-time programmable ("OTP") circuitry, analog-to-digital converters ("ADCs"), digital-to-analog-converters ("DACs"), counters, timers, input/output ("I/O") circuitry and controllers, reference circuitry, clock and timing circuitry (including distribution circuitry), arithmetic circuitry (e.g., adders, subtractors, multipliers, dividers), general and programmable logic circuitry, power regulators, or the like.

Instructions stored by memory 115, may be executable by MCU 105 to perform the various operations specified by the instructions. For example MCU 105 may include any processor capable of executing instructions. For example, the processor may be a general-purpose processor, an embedded processor, a digital signal processor (DSP), or any other suitable type of processor that implements any suitable instruction set architecture (ISA), such as, for example, one or more of the x86, ARM™, PowerPC™, SPARC™, or MIPS™ ISAs. In some embodiments, the processor may be integrated with a dedicated storage medium and/or other elements as part of an ASIC, microcontroller, or other integrated circuit structure.

Memory 115 represents an embodiment of a computer-accessible or computer-readable storage medium configured to store program instructions and data. Program instructions and/or data may be stored upon different types of computer-accessible media. In general, a computer-accessible medium or storage medium may include any type of mass storage media or memory media such as magnetic or optical media. A computer-accessible medium or storage medium may also include any volatile or non-volatile media such as RAM (e.g., SDRAM, DDR SDRAM, RDRAM, SRAM, etc.), ROM, or the like, whether included in MCU 105 as system memory 155 or another type of memory. Program instructions and data stored via a computer-accessible medium may be transmitted by transmission media or signals such as electrical, electromagnetic, or digital signals, which may be conveyed via a communication medium such as a network and/or a wireless link, such as may be implemented via any suitable interface.

In some embodiments, display 110 may include a liquid crystal display (LCD) or an organic light emitting diode (OLED) display; although any other display device may be used. Display 110 may also include a controller that receives commands from MCU 105 and display images to a user on an LCD or other type of screen. These images may contain graphics or other information that allow a user to interact with device 100. In some embodiments, display 110 may further include a touch screen controller that allows a user to enter commands directly through display 110.

Audio processor 120 may include a digital signal processor (DSP) or the like with ADCs and DACs that are configured to receive and provide audio content to a user. Moreover, audio processor 120 may be connected to one or more speakers and/or a microphone (not shown) to allow the user to participate in a phone call, listen to an audio file, record an audio message, etc.

In some embodiments, RF transceiver 125 may include an RF transmitter, an RF receiver, and an RF switch to allow full-duplex communications. In operation, the transmitter portion of RF transceiver 125 transmits voice and/or data to another wireless device (e.g., a modem, base station, etc.) using RF antenna 130. In some cases, RF antenna 130 may be implemented as an antenna array comprising two or more antenna elements or the like. Meanwhile, an RF switch allows the RF receiver portion of RF transceiver 125 to receive voice and/or data from other wireless devices through RF antenna 130. The receiver portion of RF transceiver 125 is described in more detail in the following section.

In the illustrated embodiment, components 105, 110, 115, 120, and 125 are shown as separate components of device 100. In alternative embodiments, however, two or more of components 105, 110, 115, 120, and 125 may be integrated, for example, in a single chip or microchip. In some cases, integrating components may improve the overall performance of device 100 in one or more ways such as, for example, flexibility, responsiveness, die area, cost, materials used, efficiency, accuracy, power consumption, reliability, robustness, etc. In other cases, any of components 105, 110, 115, 120, and 125 may be split into two or more discrete circuits to achieve other goals. For example, RF transceiver 125 may be split into separate transmitter and receiver circuits to reduce interference. Additionally, MCU 105 may be split into two or more individual processors to more effectively perform certain functions.

Figure 1B:
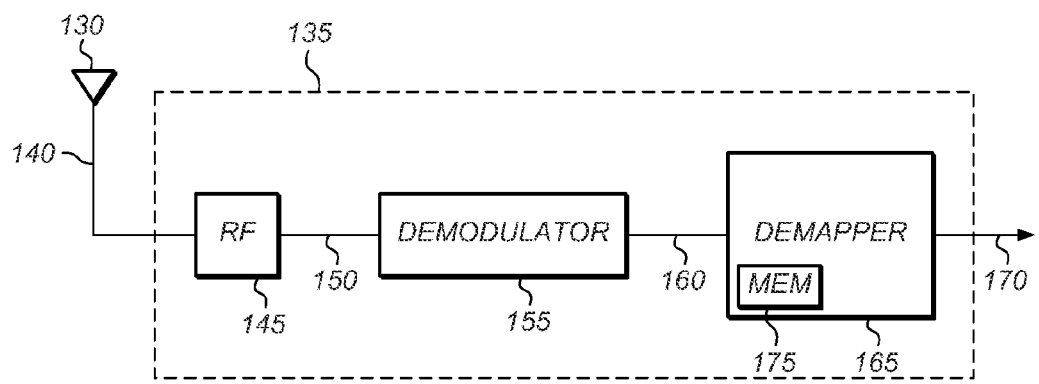
FIG. 1B is a block diagram illustrating an example embodiment of an RF receiver.

FIG. 1B is a block diagram illustrating RF receiver 135 configured to implement methods for handling data rate changes within a message. In some embodiments, RF receiver 135 may be employed as part of RF transceiver 125 of FIG. 1. As illustrated here, RF antenna 130 is connected to RF stage 145, and RF stage 145 is connected to demodulator 155. De-mapper 165 is connected to demodulator 155 and to MCU 105 (not shown).

Antenna 130 may be any RF antenna suitable for picking up RF signal 140. Meanwhile, RF circuit or stage 145 may be any circuit configured to convert RF signal 140 into intermediate frequency (IF) signal 150. To that end, RF stage 145 may include one or more amplifiers, oscillators, mixers, filters, and the like. Demodulator 155 is a circuit configured to extract data or symbols from one or more carrier waves in IF signal 150 and produce demodulated signal 160.

In some embodiments, demodulator 155 may be an analog or digital device including filters, comparators, dividers, timers, etc. In other embodiments, demodulator 155 may be programmable. For example, demodulator 155 may include one or more circuits (e.g., a DSP or the like) that may implement a demodulation algorithm in software. Software instructions may be stored within demodulator 155 and/or external memory such as memory 115 of FIG. 1.

De-mapper 165 is a circuit configured to process symbols of demodulated signal 160 and produce de-mapped signal 170. For example, de-mapper 165 may be a logic circuit, controller, processor, or a programmable circuit suitable for applying conversion instructions to demodulated signal 160. In some embodiments, de-mapper may have its own memory 175 configured to store software instructions, mathematical formulas, and/or look-up tables. In other embodiments, however, these instructions, formulas, and/or look-up tables may be stored in external memory such as, for example, memory 115 of FIG. 1.

De-mapped signal 170 may include de-mapped symbols that may then be output, for example, to MCU 105 for further processing. Although as illustrated de-mapper circuit 165 is shown as part of RF receiver 135, in alternative embodiments de-mapper 165 may be a part of MCU 105, or other circuit arrangements may be used.

Typically, at a transmitter end, digital data to be communicated to RF receiver 135 may be formatted into one or more messages (e.g., "packets" or "frames"). Generally speaking, a "packet" includes a header and a payload. The header portion of the packet includes control information that allows a communications network to properly deliver the packet to a particular device (e.g., device 100 of FIG. 1A), whereas the payload includes actual user data desired to be transmitted. A popular example of a packet is the IP packet used across the Internet and other networks. Meanwhile, a "frame" contains one or more packets as well as some additional synchronization information. This formatting process may follow any appropriate protocol or procedure, such as Internet Protocol version 4 (IPv4) or the like.

Once formatted, a digital signal containing these messages may be modulated with one or more carrier waves. Examples of modulation schemes include M-ary frequency-shift keying (FSK), Gaussian frequency-shift keying (GFSK), amplitude shift-keying (ASK), etc. In some embodiments, the digital signal may be modulated with orthogonal waveforms that communicate two or more bits as a single symbol. For example, a 4-FSK modulation scheme communicates a two-bit symbol, whereas an 8-FSK scheme conveys a three-bit symbol.

Moreover, some communication methods may allow signals to be transmitted with different modulation levels or data rates. For instance, a single protocol may allow RF signal 140 to be modulated with two levels (e.g., 2-FSK), four levels (e.g., 4-FSK), and/or eight levels (e.g., 8-FSK). These modulation schemes may be allowed to change over time. For example, a particular communication or connection may be initiated using 2-FSK modulation. If the connection is determined to be of high quality—e.g., because a signal strength measure or signal-to-noise ratio meets a threshold value—then the transmitter may increase the modulation to a higher level (e.g., 4-FSK or 8-FSK). Conversely, if an ongoing connection is determined to be of low quality—e.g., noise increases during a call, etc.—then a communication being performed using 4-FSK modulation may be downgraded to 2-FSK modulation.

Referring back to FIG. 1B, the resulting modulated signal may be transmitted to RF receiver 135 (e.g., over the air), detected as RF signal 140 by antenna 130, and converted into IF signal 150 by RF stage 145. Demodulator 155 then demodulates the binary signal or messages encoded in IF signal 150 and outputs demodulated signal 160.

In some applications, demodulation may be performed in "real time." Therefore, the adoption of various modulation data rates in the course of a communication may require the use of various demodulators working in parallel; where each demodulator may be configured to operate at a different modulation data rate. This approach, however, causes the number of demodulation circuit components and the associated power requirements to increase. In addition, if the data rate change occurs within a single packet or frame, the system may require a complex resynchronization procedure and/or time-critical circuitry dedicated to avoiding such resynchronization. As described herein, however, some embodiments of the systems and methods described are capable of handling such data rate changes with a fewer number of demodulators, or even with a single demodulator.

To this end, in some embodiments, demodulator 155 may demodulate IF signal 150 using the highest modulation scheme available under a given protocol. For instance, using the same example discussed above, if a hypothetical protocol allows RF signal 140 to be modulated with 2-FSK, 4-FSK, and 8-FSK, then demodulator 155 may demodulate the entire signal 150 using an 8-FSK demodulation scheme. In some embodiments, this demodulation operation may take place regardless of the actual data rate with which RF signal 140 (or a portion thereof) was originally modulated.

In some embodiments, a deviation ratio (in the case of multi-level FSK/GFSK) and/or a modulation depth ratio (in case of multi-level ASK) of a signal or message may be 2—e.g., it may include 4 and 2 level data rates. In other embodiments, the deviation and/or modulation depth ratios may be 4—e.g., it may include 8, 4, and 2 level data rates. In yet other embodiments, the symbol rate may be constant across some or all data rates within a message (e.g., packet or frame). For example, the number of symbols transmitted per unit of time may remain constant in some cases, although the number of bits encoded per symbol may vary.

For example, consider a situation employing the same hypothetical protocol where RF signal 140 can be modulated with 2-FSK, 4-FSK, or 8-FSK. Suppose that RF signal 140 encodes two packets, a first packet modulated with 2-FSK and a second packet modulated with 4-FSK. Instead of attempting to demodulate the first packet with a 2-FSK scheme and the second packet with a 4-FSK scheme, demodulator 155 may demodulate the entire IF signal 150 using 8-FSK. As another example, consider a case where RF signal 140 encodes a single packet, and the packet includes two segments (e.g., header and payload). Assume that a first segment (e.g., header) is modulated with 4-FSK and the second segment (e.g., payload) of the same packet is modulated with 8-FSK. Because the maximum available data rate under the hypothetical protocol is 8-FSK, demodulator 155 may still demodulate the entire packet using 8-FSK.

Once RF signal 140 is demodulated into demodulated signal 160, de-mapper circuit 165 may process the symbols within demodulated signal 160 to produce de-mapped signal 170. These additional operations are discussed below.

De-mapper 165 may receive demodulated signal 160 and produce de-mapped signal 170. As described above, demodulated signal 160 may be demodulated with a data rate higher than the data rate at which RF signal 140 was modulated. Accordingly, in some embodiments, de-mapper 165 may convert or map a high-data rate symbol (i.e., a symbol demodulated with a higher demodulation data rate) into a low-data rate symbol (i.e., a symbol with a lower original modulation data rate).

Figure 2A:
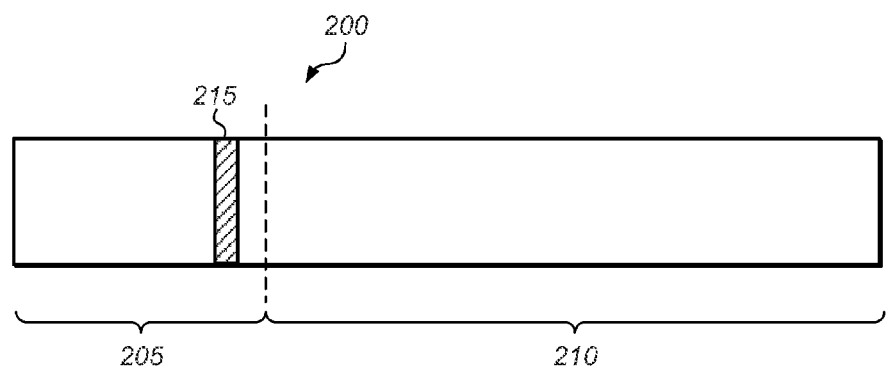
FIGS. 2A and 2B are diagrams illustrating example embodiments of messages.

In some embodiments, demodulated signal 160 may include one or more messages. For sake of illustration, FIG. 2A shows message 200 according to some embodiments. As illustrated, message 200 may be a packet or the like. Particularly, packet 200 may have two segments—header 205 and payload 210. Data rate indicator 215 may be within header 205. In other configurations, however, data rate indicator may be located elsewhere (e.g., immediately before header 205, within payload 210, etc.). In some embodiments, date rate indicator 215 may be one or more bits, codes, or symbols that contain information about the modulation data rate of payload 210 (or any subsequent message portion or segment). For example, header 205 may be modulated with a first modulation data rate, payload 210 may be modulated with a second modulation data rate, and the first modulation data rate may be different from the second modulation data rate. In this case, data rate indicator 215 may contain information regarding the second modulation data rate.

Figure 2B:
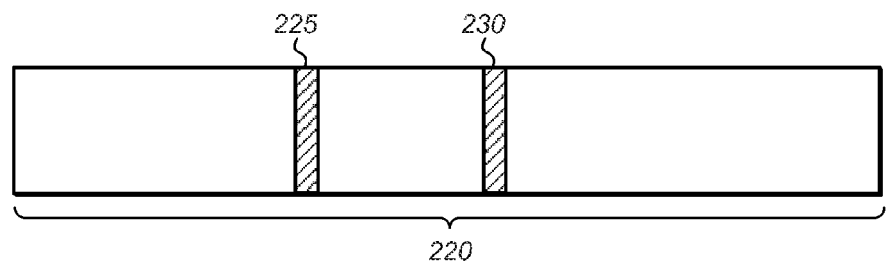

Message 220 of FIG. 2B may be one or more packets, one or more frames, or any other message. As illustrated, message 220 includes two data rate indicators 225 and 230. Accordingly, in this particular embodiment, message 220 may have three modulation data rates—i.e., an initial modulation data rate corresponding to the segment to the left of data rate indicator 225, a second modulation data rate corresponding to the segment between data rate indicators 225 and 230, and a third modulation data rate corresponding to the segment to the right of data rate indicator 230. It should be understood, however, that any number of data rate indicators may be used in any message, and these indicators may be located anywhere within the message.

Figure 3:
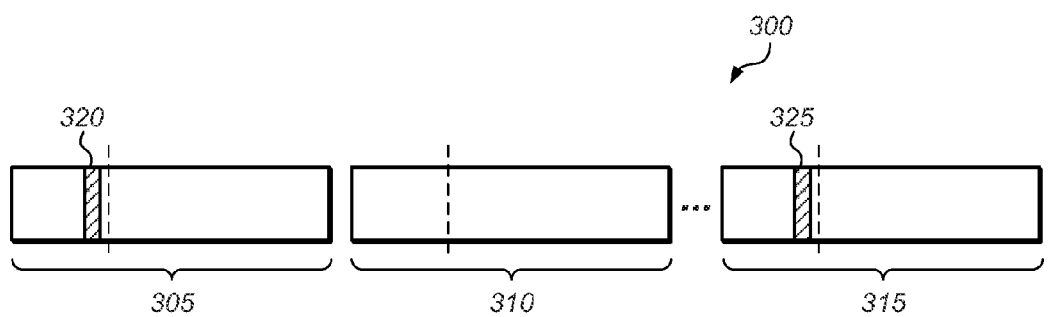
FIG. 3 is a diagram illustrating an example of a sequence of messages.

FIG. 3 is a diagram illustrating a sequence of messages 300 according to certain embodiments. For example, this sequence of messages may be a data stream 300 within demodulated signal 160. As illustrated, data stream 300 includes at least three messages 305, 310, and 315. First message 305 may be a packet or frame having a header modulated with a first modulation level. Data rate indicator 320 may contain information indicating that subsequent data within the same message is modulated with a second modulation level. Second message 310 does not include a data rate indicator, so it may be understood that it is modulated with the same data rate indicated in the preceding indicator—i.e., data rate indicator 320. The header of third message 315 is also modulated with that same data rate; however, data rate indicator 325 indicates that the remainder of message 315 is modulated with a third modulation data rate.

Data stream 300 may be explained, for example, by any number of hypothetical scenarios. For example, assume that message 305 is the first message received in the communication. Under a given communication protocol, at least a portion of that first message may be encoded using a pre-determined modulation data rate (e.g., 2-FSK). After that, however, a second portion of the message may be modulated using a higher modulation data rate (e.g., 16-FSK). Accordingly, data rate indicator 320 may provide information that allows a receiver to determine that, from that point forward, data is modulated using the higher rate. In some embodiments, a data rate indicator indicates that the very next symbol was modulated with a different data rate. In other embodiments, a data rate indicator may inform that the actual data rate change will take place a number of symbols down the stream.

Now assume that, after second message 310 is received, the system detects that the 16-FSK modulation data rate is not fully supported or yields unsatisfactory signal quality. Upon this determination, data rate indicator 325 may inform, for example, that the remainder of message 315 is modulated using a lower modulation data rate (e.g., 8 or 4-FSK). In other words, as the communications system adapts to new conditions and modifies the rate of modulation or transmission of the signal or message, a corresponding data rate indicator may be provided within a signal or message. It should be emphasized that this example is provide as an illustration only, and that that many variations are possible.

Figure 4:
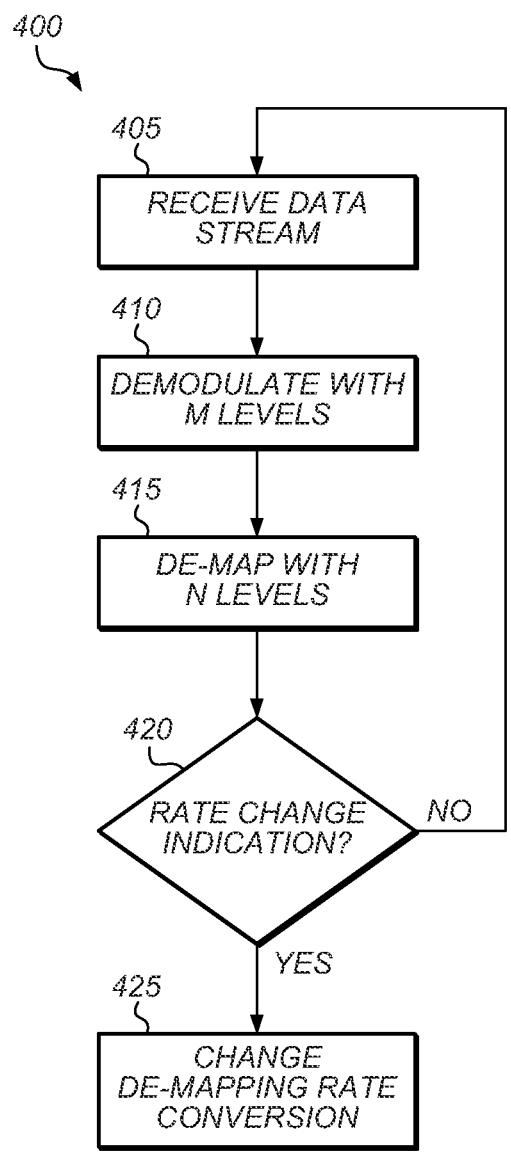
FIG. 4 is a flowchart of an example embodiment of a method for handling data rate changes within a packet or frame.

With reference to FIG. 4 a flowchart of a method for handling data rate changes within a packet or frame is depicted according to certain embodiments. At 405, demodulator 155 receives a data stream within IF signal 150. At 410, demodulator 155 demodulates the data stream using a demodulation scheme based on M levels. In some embodiments, M is a power of 2 (e.g., 2, 4, 8, 16, 32, 64, etc.), such that each symbol contains $\log_2 M$ bits. When M is different from the number of levels N of the message being processed, de-mapper 165 may convert M-level symbols to N-level symbols at 415. In some embodiments, M may be an even multiple (i.e., an even number that is a multiple) of N. Accordingly, the conversion process may involve mapping an element having $\log_2 M$ bits into a converted element having $\log_2 N$ bits.

At 420, de-mapper 165 may determine whether the message being processed contains a data rate indicator. If not, then de-mapper 165 may continue the same operation on subsequent symbols received in the data stream. On the other hand, if de-mapper 165 detects data rate indicator showing that a subsequent message segment is modulated with P levels, then de-mapper 165 may modify the conversion operation to output P-level symbols. Although in this example the data rate indicator is detected by de-mapper 165, this functionality may be provided by any other system component that is, for example, capable of performing packet inspection.

Figure 5:
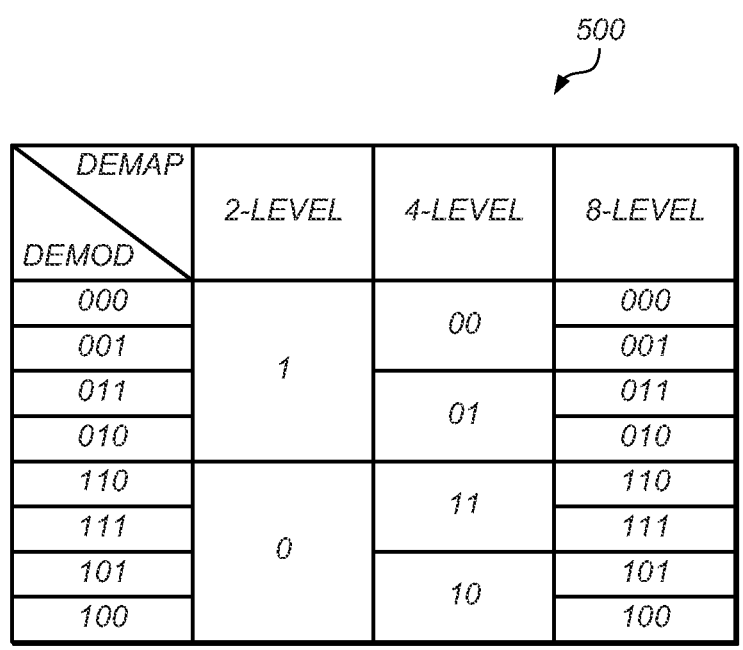
FIG. 5 is an example of a de-mapper conversion table.

Turning now to FIG. 5, illustrative de-mapper conversion table 500 is shown according to certain embodiments. The conversion operation is illustrated in a table format ease of understanding; however, it should be understood that similar operations may be implemented using mathematical formulas, programming instructions or rules, etc. Furthermore, this specific table is applicable for a system where 2 level, 4 level, and 8 level modulation schemes are used. However, it should be understood that, in other situations, other tables having more or less levels may be similarly built.

As illustrated, the left column of table 500 shows the output of demodulator 155 as three-bit symbols (e.g., 000, 001, 011, etc.). This indicates that, in this example (i.e., a system with 2 level, 4 level, and 8 level possible modulation schemes), demodulator 155 normally operates at its maximum data rate of three bits per symbol—i.e., an eight-level modulation scheme such as 8-FSK, or the like. Meanwhile, the top row of table 500 shows a de-mapping conversion of the demodulated three-bit symbols (e.g., 8-FSK) into one-bit symbols (e.g., 2-FSK) and two-bit symbols (e.g., 4-FSK). Although depicted here for clarity purposes, in other implementations, the last column of table 500 (showing a 1:1 conversion of three-bit symbols into the same three-bit symbols) may be omitted.

It should be noted that the values on the far left column of table 500 (output of demodulator 155) are ordered following a Gray code, such that two successive values differ by one bit. In some embodiments, it has been determined that the use of Gray coding may make the de-mapping process less susceptible to noise and/or spurious output. However, in other embodiments, alternatives to Gray coding may be used.

As shown in FIG. 5, a message or segment thereof may include a symbol demodulated with M=8. If a data rate indicator indicates that the message or segment was in fact modulated with N=2, for example, then de-mapper 165 may transform the symbol from a 3-bit representation to a 1-bit representation. For example, a 010 symbol may be converted to a 1, and a 111 symbol may be converted to a 0. On the other hand, if another data rate indicator indicates that another message or segment was modulated with N=4, then de-mapper 165 may transform the symbol from a 3-bit representation to a 2-bit representation. For example, the 010 symbol may be converted to a 01, and the 111 symbol may be converted to a 11. Finally, if the data rate indicator indicates that the message or segment was modulated with N=8, then de-mapper 165 may output the incoming symbol in demodulated signal 160 as signal 170 without further processing (or it may perform a 1:1 conversion).

As described above, some embodiments of the systems and methods described herein allow a de-mapping process to be executed the time-critical demodulation process. In some instances, these systems and methods enable handling of data rate changes within a packet or frame while avoiding the need for resynchronization and without the use of complex and time-critical circuitry. Further, these embodiments reduce the number of gates and power consumption of RF transceivers and communications devices.

Although the embodiments above have been described in considerable detail, numerous variations and modifications will become apparent to a person of ordinary skill in the art once the specification is fully appreciated. It is intended that the following claims be interpreted to embrace all such variations and modifications.

What is claimed is:

1. A system, comprising:
   a radio frequency (RF) circuit configured to receive a message having a plurality of segments, including a first segment that is modulated according to a first modulation scheme;
   a demodulator circuit configured to demodulate the first segment according to a second modulation scheme to produce a first demodulated segment, wherein a given symbol of the second modulation scheme is representative of a larger number of bits than a given symbol of the first modulation scheme; and
   a de-mapper circuit configured to convert the first demodulated segment into a first converted segment, by mapping symbols of the second modulation scheme to symbols of the first modulation scheme.

2. The system of claim 1, wherein the message includes a second segment modulated with a third modulation scheme different from the first modulation scheme, wherein the demodulator circuit is configured to demodulate the second segment according to the second modulation scheme into a second demodulated segment, and wherein the de-mapper circuit is configured to convert the second demodulated segment into a second converted segment.

3. The system of claim 1, wherein the message comprises one or more packets or frames.

4. The system of claim 1, wherein the second modulation scheme is a frequency-shift keying (FSK) modulation scheme, and wherein the de-mapper circuit is configured to convert the first demodulated segment without resynchronization.

5. The system of claim 1, wherein the de-mapper circuit is further configured to convert the first demodulated segment into the first converted segment based, at least in part, on a data rate change indication detected within the message.

6. The system of claim 1, wherein the second modulation scheme is an amplitude-shift keying (ASK) modulation scheme.

7. The system of claim 1, wherein the RF circuit is configured to receive a message having a constant symbol rate.

8. An apparatus, comprising:
   a demodulator configured to receive a message modulated at least in part with a first modulation scheme having a first data rate and to demodulate the message according to a second modulation scheme having a second data rate, wherein the first data rate is different from the second data rate; and
   a de-mapper configured to convert symbols from the second modulation scheme and representative of a first portion of the demodulated message to symbols of the first modulation scheme portion, wherein the de-mapper is configured to convert the symbols based, at least in part, on an indication within the message that the first portion was modulated with the first modulation scheme.

9. The apparatus of claim 8, wherein the de-mapper is configured to store a table usable to map symbols of the second modulation scheme to symbols of the first modulation scheme.

10. The apparatus of claim 9, wherein the table is further usable to map symbols of the second modulation scheme to symbols of a third modulation scheme.

11. The apparatus of claim 8, wherein the first portion is a packet header.

12. The apparatus of claim 8, wherein at least the de-mapper is implemented by a processor that, during operation, retrieves instructions from a memory and executes the instructions to cause the apparatus to perform operations including:
    receiving the demodulated message; and
    converting the symbols from the second modulation scheme to the symbols of the first modulation scheme.

13. The apparatus of claim 8, wherein a deviation or modulation depth ratio of the message is 2 or 4.

14. A method, comprising:
    receiving a first message having a first portion modulated with a N-level modulation scheme;
    demodulating the first portion with a M-level modulation scheme to produce a first demodulated portion, where M and N are integers and M is an even multiple of N; and
    converting the first demodulated portion into a first converted portion by mapping symbols of the M-level modulation scheme to symbols of the N-level modulation scheme.

15. The method of claim 14, wherein the converting comprises identifying an indication within the first message that the first portion is modulated with the N-level modulation scheme.

16. The method of claim 14, wherein the N-level modulation scheme is a N-level Gaussian frequency-shift keying (GFSK) modulation scheme.

17. The method of claim 14, wherein the first message has a second portion modulated with a P-level modulation scheme, where P is an integer different than N, and M is an even multiple of P, the method further comprising:
    demodulating the second portion with the M-level modulation scheme to produce a second demodulated portion; and
    converting the second demodulated portion into a second converted portion based, at least in part, on an indication within the first message that the second portion is modulated with the P-level modulation scheme.

18. The method of claim 14, further comprising:
    receiving a second message having a second portion modulated with the N level modulation scheme and a third portion modulated with a P-level modulation scheme, wherein P is an integer different than N, and wherein M is an even multiple of P;
    demodulating the second portion with the M-level modulation scheme to produce a second demodulated portion;
    demodulating the third portion with the M-level modulation scheme to produce a third demodulated portion;
    converting the second demodulated portion into a second converted portion; and
    converting the third demodulated portion into a third converted portion.

19. The method of claim 18, wherein converting the third demodulated portion is based, at least in part, on an indication within the second message that the third portion is modulated with the P-level modulation scheme.

* * * * *